D. C. GATELY.
Thill Coupling.
No. 86,387.
Patented Feb. 2, 1869.
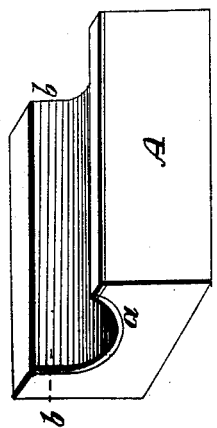
Witnesses.
Wm H McCabe
Inventor:
Dennis C. Gately
by A Pollok
his attorney.

United States Patent Office.

DENNIS C. GATELY, OF NEWTOWN, CONNECTICUT, ASSIGNOR TO NEW YORK BELTING AND PACKING COMPANY.

*Letters Patent No. 86,387, dated February 2, 1869.*

IMPROVED ANTI-RATTLER FOR CARRIAGES.

The Schedule referred to in these Letters Patent and making part of the same.

*To whom it may concern:*

Be it known that I, DENNIS C. GATELY, of Newtown, in the county of Fairfield, and State of Connecticut, have invented certain new and useful Improvements in Anti-Rattlers for the Shafts of Carriages and other vehicles; and I hereby declare the following to be a full, clear, and exact description of the same.

The shafts of carriages and other vehicles are attached to the axle, as is well known, by means of bolts, which pass through eyes in the ends of the shafts, and clips which are secured upon the axle; and it is equally well known that, when thus attached, the movement of the bolts and shafts will not only cause both to become worn and injured, but will in course of time produce a rattling noise, extremely disagreeable.

To remove these disadvantages, blocks of vulcanized rubber, or other elastic material, have been inserted between the clips and the ends of the shafts, as described in the patent of Chapman, dated August 8, 1854, the blocks being cut out and rounded, so as to partly fit around the shaft-ends. The advantages attending the use of these "anti-rattling" devices are fully recognized, and they are now in general use. As heretofore made, however, they are open to some objections. The heat and friction, caused by the movement of the shafts, tend to wear the rubber, and to soften it and make it gummy, which latter defect is also occasioned by the grease which is often applied to the joint between the shaft and the clip, and which, as is well known, attacks and softens the rubber. The grit and dust rising from the road adhere to the rubber when in this state, and form a mass, which tends to jam the shafts, and to injure both the elastic block. the shafts, and the clips.

The object I have in view is to obviate these defects; and, to this end,

My invention consists in coating that face of the block of India rubber, or other elastic material, which is in contact with the shaft, with canvas, cloth, or other suitable fibrous or textile material, which will remove the rubber from immediate contact with the shaft, protect it from grit, and dust, and grease, and prevent it, to a great extent, from being worn, and heated, and softened.

As the manner in which these elastic blocks are applied to carriages and other vehicles is well known, I have not deemed it necessary to represent in the drawings the position of the shaft, bolt, clip, and elastic block when put together, but have simply represented in perspective the block, made in accordance with my invention.

The rubber block A, which is compressed between the end of the shaft and the clip, is of suitable size and shape to adapt it to the purposes for which it is designed, and is hollowed out at $a$, so that it may fit around the end of the shaft, with which it is in contact.

This part, therefore, for the reasons above given, I cover or coat with canvas, or equivalent material, $b$, which, as before stated, serves perfectly to protect the rubber from injury.

The canvas or cloth is best applied to the rubber while the latter is in a plastic condition, and yet unvulcanized. The two are then pressed together in the mould, by which means they are firmly and closely united, and the rubber is then vulcanized, which process completes the article.

The block or rubber strip, with its canvas or cloth coating, may be made of considerable length, and afterward cut up into shorter pieces, of the size required.

Having now described my invention, and the manner in which the same is or may be carried into effect,

What I claim, and desire to secure by Letters Patent, is—

As a new article of manufacture, an anti-rattler, for carriages and other vehicles, composed of a block of India rubber, having that portion in contact with the end of the shaft coated or covered with cloth or canvas, or equivalent material, united, by vulcanization, with said block, substantially as and for the purposes shown and set forth.

In testimony whereof, I have signed my name to this specification, before two subscribing witnesses.

D. C. GATELY.

Witnesses:
 HENRY BEERS GLOVER,
 FLORENCE S. GLOVER.